3,153,085
PRODUCTION OF ALIPHATIC NITRILES
David James Hadley, Epsom Downs, England, assignor to The Distillers Company Limited, Edinburgh, Scotland, a British company
No Drawing. Filed Jan. 25, 1960, Ser. No. 4,220
2 Claims. (Cl. 260—465.3)

The present invention relates to the production of unsaturated aliphatic nitriles, and in particular to the production of acrylonitrile and methacrylonitrile.

According to the present invention, the process for the production of acrylonitrile or methacrylonitrile comprises reacting at an elevated temperature in the vapour phase propylene or isobutene with oxygen and ammonia over an oxidation catalyst, as defined below.

The catalysts used in the process of the present invention must include molybdenum, oxygen and cobalt and may be regarded either as mixtures of molybdenum oxides with cobalt oxides or as oxygen-containing compounds of molybdenum and cobalt, such as cobalt molybdate. Under the reaction conditions the catalyst may be present in both forms. The expression "cobalt molybdate" as employed in the appended claims designates (1) a mixture of the oxides of molybdenum and cobalt, and/or (2) a compound of molybdenum, cobalt and oxygen. The catalyst may include minor proportions of additional elements such as tellurium, e.g., as tellurium oxides, and may if desired be deposited on a support such as alumina or silica. The catalyst may be conveniently prepared, for example, by precipitation from mixed solutions of cobalt and molybdenum salts. It is preferred to prepare the catalyst by forming a complex of (a) cobalt oxides, (b) molybdenum oxides, and (c) ammonia or a water-soluble aliphatic amine, and subjecting the complex to a heat-treatment. The catalyst is suitably prepared, for example, by mixing an aqueous solution of a cobalt salt with an aqueous solution or suspension of molybdic acid or a molybdic acid salt, adding ammonia or a water-soluble aliphatic amine such as ethanolamine to the aqueous mixture, drying the resulting precipitate, and heating it to a temperature in the range 400° to 700° C. A variation of this method is to form an aqueous solution of a cobalt salt and ammonium molybdate, heating the mixture until a precipitate forms, drying the precipitate and subjecting it to a heat treatment as before. Another method of preparing the catalyst consists in adding ammonia or a water-soluble amine to an aqueous solution of a cobalt salt, and mixing the resulting precipitate with molybdic acid or a salt of molybdic acid with a volatile base either as such or as a solution or suspension for instance in water, the mixture then being evaporated to dryness and subjected to heat treatment as described above.

The ratio of cobalt to molybdenum in the catalyst may vary within moderately wide limits, but it is preferred to use a molar ratio not substantially greater than 1:1.

The reaction of propylene or isobutene with oxygen and ammonia over the catalyst may be carried out in any suitable manner, for instance as a fixed bed process, or as a fluidised bed process.

The proportion of olefine in the feed may vary within fairly wide limits, for example between 1 and 20% by volume. It is preferred to use between about 2 and 10% by volume of the olefine.

The concentration of oxygen in the feed may also vary within moderately wide limits, for example between 1 and 20% by volume and preferably between 2 and 15% by volume. The oxygen may be diluted with inert gases, and may be, for example, supplied as air.

It is preferred to carry out the reaction in the presence, as diluent, of a gas which is substantially inert under the conditions of reaction, for example, nitrogen, propane, butane, isobutene, carbon dioxide and steam. It is preferred to use steam or nitrogen or mixtures thereof. The concentration of the steam may vary within wide limits, for instance between 20 and 60% by volume of the feed.

The concentration of ammonia may also vary within moderately wide limits, for instance up to 10% by volume of the feed. If too little ammonia is present, the maximum yield of acrylonitrile is not obtained. If the maximum yield of acrylonitrile is required it is necessary to use a sufficient excess of ammonia such that unreacted ammonia is present in the gas mixture issuing from the reactor. It is preferred to use a sufficient excess of ammonia such that the gas mixture issuing from the reactor contains at least 1 mole of ammonia for every 10 moles of acrylonitrile.

The reaction is carried out at an elevated temperature, preferably between 300 and 500° C.

The contact time may be, for example, in the range 1–30 seconds.

The unsaturated nitrile may be recovered from the reaction products in any suitable manner, for example by countercurrent extraction with water, preferably at an acid pH, followed by fractional distillation.

The process of the invention is further illustrated with reference to the following examples, in which the parts by weight and parts by volume bear the same relation to each other as do grams to millilitres.

*Example 1*

A solution of cobalt nitrate (1300 parts by weight) in water (1340 parts by volume) was added to a solution of ammonium molybdate (790 parts by weight) in water (1000 parts by volume) and to this well stirred mixture at room temperature ammonia solution (371 parts by volume of 0.880 ammonia in 371 parts by volume of water) was added dropwise. The precipitate was collected and thoroughly washed with water and dried at 95° C. The granules were then sieved to 8 to 16 mesh B.S.S. and heat-treated at 550° C. for 16 hours. The molar ratio of cobalt to molybdenum in the catalyst was 1:1.04.

A reactor containing 19.7 grams of the catalyst was contained in a liquid bath maintained at 447° C. A gaseous mixture of propylene (10% by volume), air (50% by volume), steam (34.25% by volume) and ammonia (6.04% by volume) was passed over the catalyst at a rate of 25,080 parts by volume per hour (measured at N.T.P.) (contact time —4.1 seconds).

Of the total propylene fed to the reactor, 17.8% was converted to acrylonitrile, 2.87% to carbon dioxide and 64.5% was recovered unchanged. The yield of acrylonitrile based on propylene consumed was 50.1%.

*Example 2*

A reactor containing 15 grams of a cobalt molybdate catalyst, prepared similarly to the catalyst in Example 1, was placed in a liquid bath maintained at 450° C. A gaseous mixture of propylene (12.0% by volume), oxygen (10.3% by volume), nitrogen (35.4% by volume), steam (38.5% by volume) and ammonia (3.8% by volume) was passed over the catalyst at a rate of 13,100 parts by volume per hour (measured at N.T.P.) (contact time —6 seconds).

Of the total propylene fed to the reactor, 17.9% was converted to acrylonitrile, 4.3% to carbon dioxide and 58.3% was recovered unchanged. The yield of acrylonitrile based on propylene consumed was 43%.

*Example 3*

The cobalt molybdate catalyst prepared as described in Example 1 was intimately mixed with 0.2% by weight of powdered tellurium dioxide. 20 parts by weight of this catalyst were placed in a reactor maintained at 446° C. A gaseous mixture of propylene (9.8% by volume), air (50.1% by volume), steam (34.1% by volume) and ammonia (5.93% by volume) was passed over the catalyst at a rate of 25,480 parts by volume per hour (measured at N.T.P.). The contact time was 3.95 seconds.

Of the total propylene fed to the reactor 31.7% was converted to acrylonitrile, 4.19% to carbon dioxide and 44.98% was recovered unchanged. The yield of acrylonitrile based on propylene consumed was 57.6%.

Example 4

Ammonium molybdate (176.6 parts by weight) was dissolved in 200 parts by volume of distilled water. 83 parts by volume of ammonia (specific gravity 0.880) were added to the ammonium molybdate solution maintained at 60° C. Cobalt nitrate hexahydrate (291.1 parts by weight) was dissolved in 300 parts by volume of distilled water. The cobalt nitrate solution, at 60° C., was added slowly with stirring to the ammoniacal solution of ammonium molybdate, maintaining the temperature at about 60° C. Stirring was continued for 15 minutes after the cobalt nitrate solution had been added to the ammoniacal ammonium molybdate solution. The suspension of cobalt molybdate was allowed to stand overnight, filtered, washed with water, dried and ground to a powder.

The cobalt molybdate was then mixed with tellurium dioxide in 1:1 molar ratio by grinding. The resultant mixture was heated in air at 400° C. for 4.5 hours.

39.5 parts by weight of the catalyst were placed in a reactor maintained at 400° C. A gas mixture comprising 2% by volume of propylene, 4% by volume of ammonia and 94% by volume of air was passed over the catalyst at a rate of 25,000 parts by volume per hour at N.T.P.

54.8% of the propylene fed was converted to acrylonitrile, 10.2% to acrylic acid and 5.1% to carbon dioxide. 6.5% of the propylene was recovered unchanged. The yield of acrylonitrile based on propylene consumed was 58.6%.

Example 5

The process of Example 4 was repeated except that the propylene in the feed was replaced by isobutene. A gas mixture comprising 2.47% by volume of isobutene, 4.24% by volume of ammonia, and 93.3% by volume of air was passed over the catalyst at a rate of 23,582 parts by volume per hour (measured at N.T.P.). The contact time was 4.25 seconds and the reaction temperature was 366° C.

Of the isobutene fed 6.2% was converted to methacrylonitrile, 7.6% to carbon dioxide and 52.3% was recovered unchanged. The yield of methacrylonitrile based on propylene consumed was 13%.

I claim:

1. A process which comprises reacting at about 300 to about 500° C. in the vapour phase a substance selected from the group consisting of propylene to produce acrylonitrile and isobutene to produce methacrylonitrile, with oxygen and ammonia, such substance being present in 1–20% by volume, oxygen 1–20% by volume, and ammonia in stoichiometrical excess and sufficient to provide an excess after reaction, over an oxidation catalyst selected from the group consisting of cobalt molybdate and cobalt molybdate with tellurium oxide, wherein said cobalt molybdate is prepared by adding a substance selected from the group consisting of molybdic acid and molybdic acid salt and a substance selected from the group consisting of ammonia and a water soluble amine, separately, to an aqueous solution of a cobalt salt, and heating the resultant mixture in the range of 400 to 700° C.

2. A process which comprises heating in the vapour phase to about 300 to about 500° C. a mixture in which the reactants consist of propylene, oxygen and ammonia in the presence of an inert gaseous diluent, and an oxidation catalyst which consists of cobalt molybdate and tellurium oxide, wherein said cobalt molybdate is prepared by adding a substance selected from the group consisting of molybdic acid and molybdic acid salt and a substance selected from the group consisting of ammonia and a water soluble amine, separately, to an aqueous solution of a cobalt salt, and heating the resultant mixture in the range of 400 to 700° C. to produce acrylonitrile.

References Cited in the file of this patent

UNITED STATES PATENTS

| 2,481,826 | Cosby | Sept. 13, 1949 |
|---|---|---|
| 2,904,580 | Idol | Sept. 15, 1959 |
| 3,009,943 | Hadley et al. | Nov. 21, 1961 |

UNITED STATES PATENT OFFICE
CERTIFICATE OF CORRECTION

Patent No. 3,153,085                                      October 13, 1964

David James Hadley

It is hereby certified that error appears in the above numbered patent requiring correction and that the said Letters Patent should read as corrected below.

Column 1, line 42, for "n" read -- in --; column 2, line 2, for "isobutene" read -- isobutane --; column 3, line 2, for "9.8%" read -- 9.87% --.

Signed and sealed this 26th day of January 1965.

(SEAL)
Attest:

ERNEST W. SWIDER                                      EDWARD J. BRENNER
Attesting Officer                                          Commissioner of Patents